United States Patent [19]

Fujimori et al.

[11] Patent Number: 5,663,852
[45] Date of Patent: Sep. 2, 1997

[54] DISK DRIVE DEVICE

[75] Inventors: Kazuyoshi Fujimori; Noboru Yamada, both of Suwa, Japan

[73] Assignee: Seiko Epson Corporation, Tokyo, Japan

[21] Appl. No.: 578,099

[22] Filed: Dec. 27, 1995

[30] Foreign Application Priority Data

Dec. 27, 1994 [JP] Japan .................................. 6-326484

[51] Int. Cl.[6] ........................ G11B 17/02; G11B 17/04
[52] U.S. Cl. .............................. 360/99.12; 360/99.06
[58] Field of Search ................... 360/99.02, 99.06, 360/99.01, 137, 99.12; 369/77.2, 77.1, 75.2, 75.1, 256

[56] References Cited

U.S. PATENT DOCUMENTS

| 3,770,908 | 11/1973 | Craggs ........................ 360/99.02 |
| 4,660,111 | 4/1987 | Morimoto ................... 360/99.02 |
| 4,709,286 | 11/1987 | Koike .......................... 360/99.02 |
| 5,187,622 | 2/1993 | Watanabe .................... 360/99.02 |

*Primary Examiner*—Stuart S. Levy
*Assistant Examiner*—Allen Cao
*Attorney, Agent, or Firm*—W. Glen Johnson

[57] ABSTRACT

A disk drive suitable for receiving removable, cartridge-based media including a movable shutter, comprising a cartridge holder having a bottom guiding area divided into two sections along the side of the cartridge, along with a shutter guide formed therebetween near a central rotary drive used to position the media within the cartridge. The shutter guide guides the cartridge shutter upward from the central rotary drive when a cartridge is either being inserted into or extracted from the holder. Therefore, the cartridge can always be extracted even when the cartridge shutter comes close to the rotary drive due to its own weight and without being directly guided by the cartridge holder. Furthermore, the shutter guide is preferably formed protruding toward the central rotary drive and disposed adjacent thereto, it is possible to guide the cartridge shutter only when it passes near the rotary drive during cartridge extraction, and thus no undue force is applied to the cartridge when it is positioned for read/write access.

10 Claims, 3 Drawing Sheets

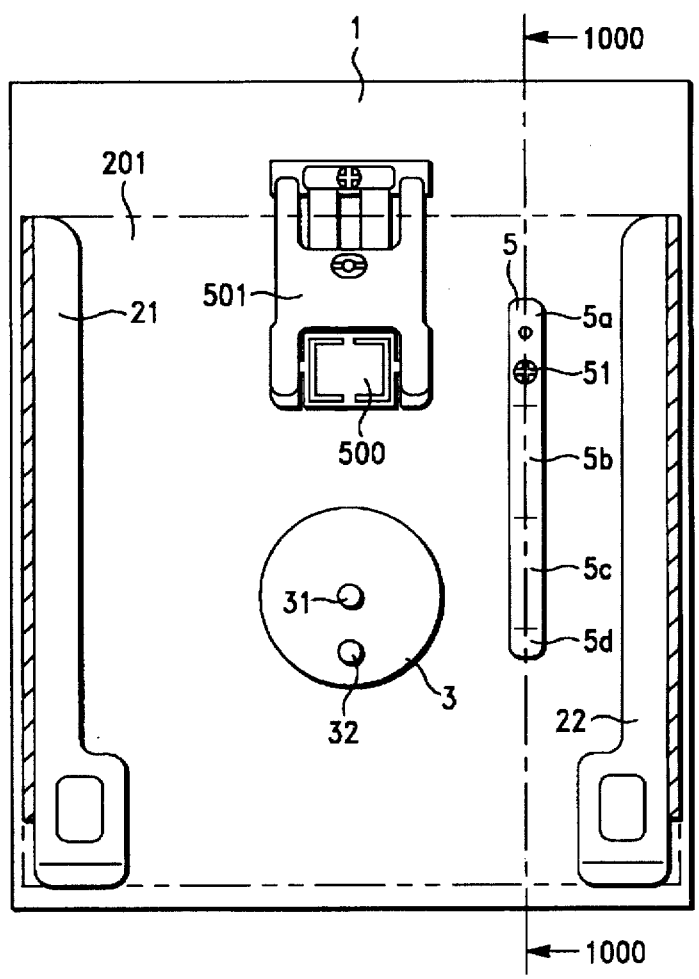
FIG.—1
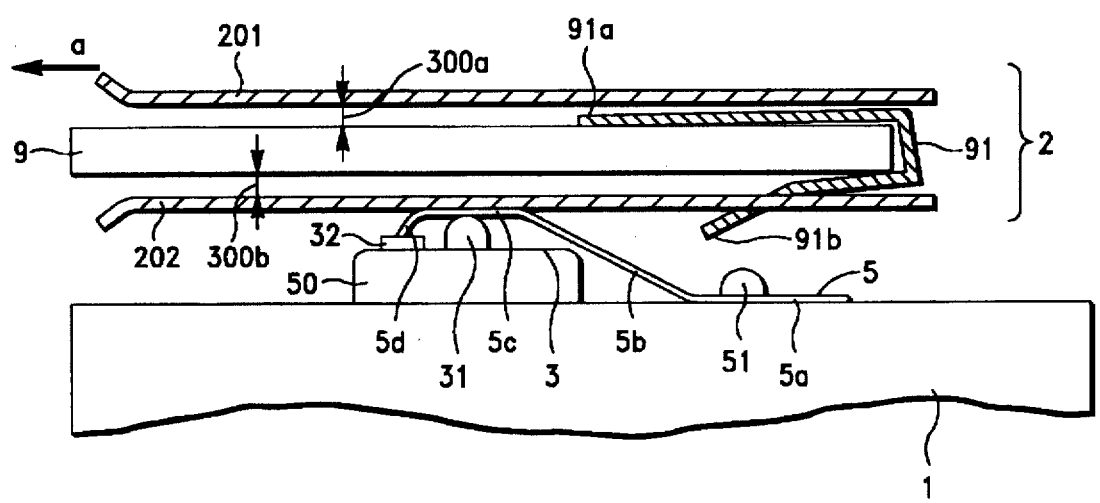
FIG.—2

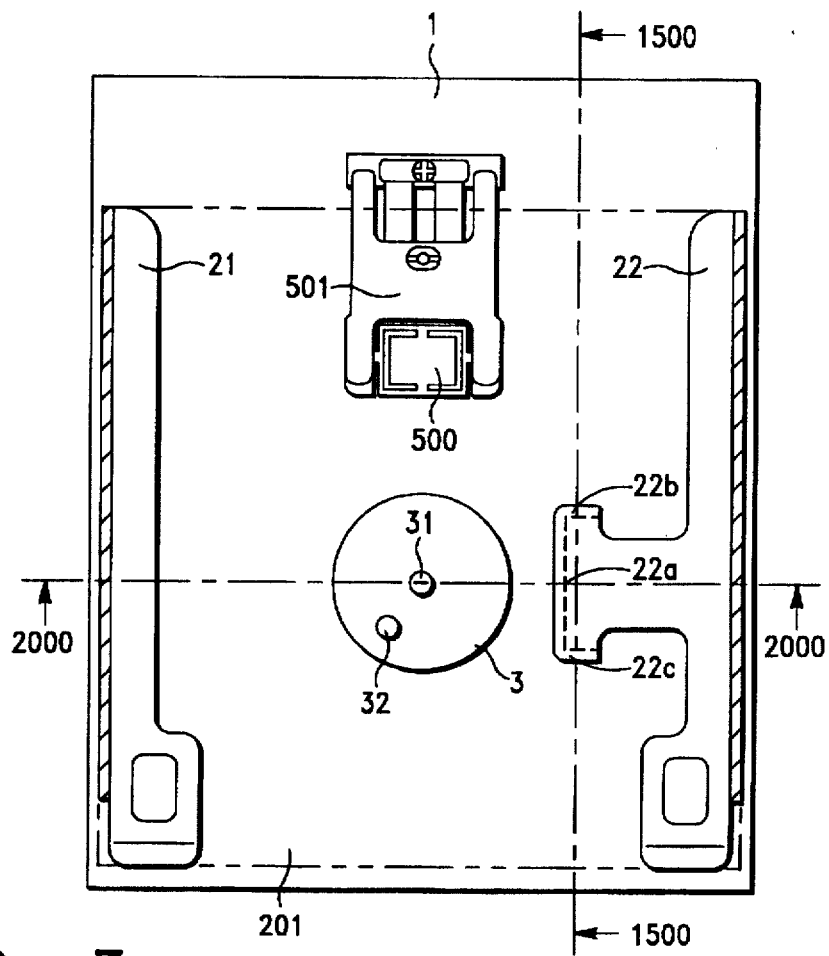
FIG.−3
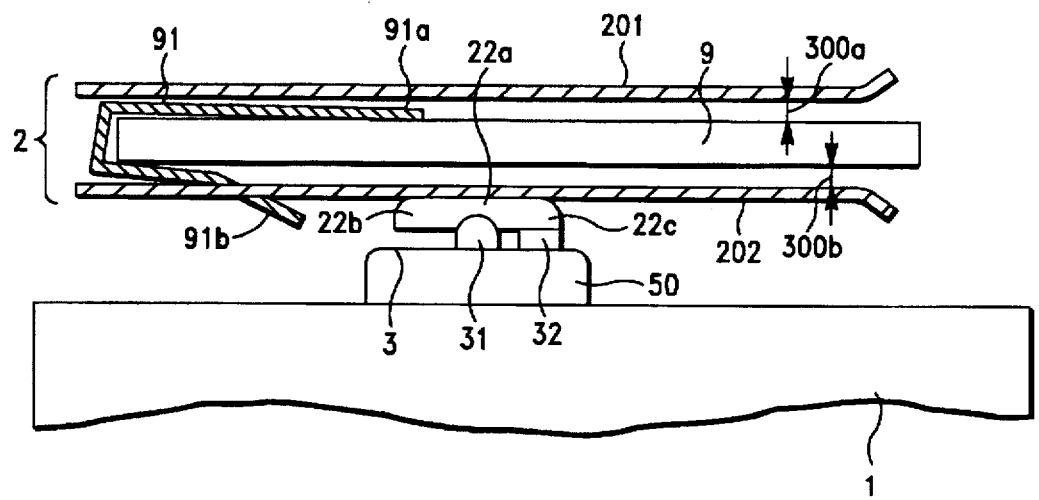
FIG.−4

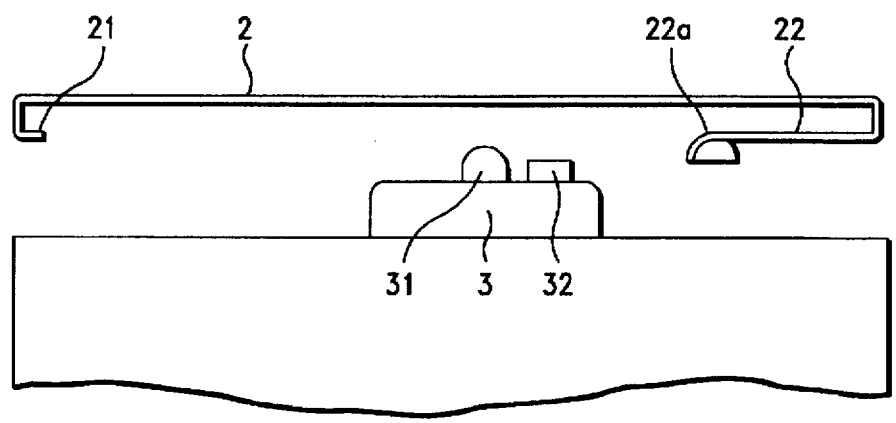
FIG.—5
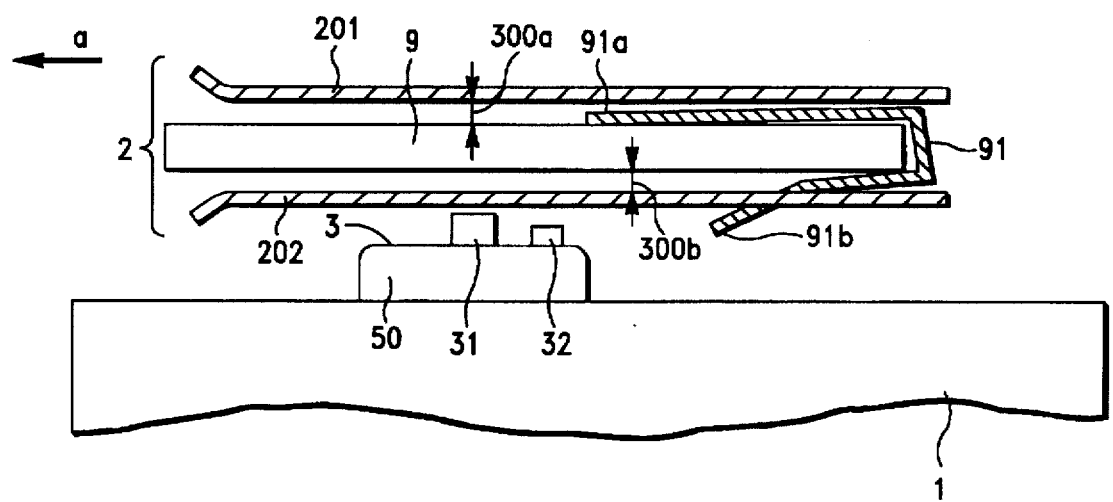
FIG.—6
(PRIOR ART)

DISK DRIVE DEVICE

BACKGROUND OF THE INVENTION

1. Field of the Invention

This invention relates generally to a disk drive device capable of accepting removable cartridge-housed disk media and which records on or reads from said recording medium, and more particularly to improvements in the disk cartridge insertion/extraction mechanism of a slimline disk drive device.

2. Description of the Related Art

A device has been known that records/reads information using a disk cartridge (hereafter referred to as "cartridge") possessing a shutter that selectively covers the magnetic head insertion opening. In such a device, recording/reading is performed by having both the top and bottom heads contact both surfaces of a disk-shaped recording medium (hereafter simply referred to as "disk") stored inside a cartridge. To replace the cartridge, this cartridge is usually moved to a position (insertion/extraction position) where it does not contact the bottom head, in the direction perpendicular to the disk surface, and the other head, i.e., the top head, is moved upward to an insertion/extraction position where it does not contact the cartridge in a similar manner, in order to prevent the cartridge from contacting either the top or bottom head. Naturally, the cartridge insertion/extraction position is located in a spot where the disk does not contact the disk rotation drive mechanism (hereafter simply referred to as "rotation drive mechanism") comprising a drive axis which engages with and drives the hub platform on which the disk is placed, center axis extending from the hub platform, and coupled to the disk.

As overall device size reduction has continued in recent years, the area occupied by the cartridge within an accepting device has been proportionally increasing. Furthermore, as device thickness is reduced, the distance between the recording/reading position and the insertion/extraction position over which the cartridge moves has become a major factor in determining the device thickness. Therefore, schemes have been devised that retreat both the top and bottom heads to avoid the contact between the heads and the cartridge, such that it is possible to insert/extract the cartridge by moving it a smaller distance sufficient for avoiding the center and drive axes.

Conventional cartridge-housed disk drive incorporate a rigid rectangular tube holder barely larger than the disk cartridge it is designed to hold. The cartridge can be reviewed at one end of the tube known as the insertion/extraction slot. The opposing end of this tube holder is also typically left open so that ejection machinery may engage the disk cartridge and to provide easy service access when the cartridge will not eject.

The underside of the tube holder is also left largely open to minimize contact with the chassis and accommodate the central drive mechanism used to rotate the disk within the cartridge yet still provide a slimline profile. In fact, in most conventional holder designs, nearly the entire underside is removed or left open to partially accommodate the chassis. Also, the surface of chassis is shaped to include indentations and grooves to further reduce space margins between it and the holder. However, shaping the chassis in such a manner deteriorates its overall strength and resistance to deformation, especially at the central spindle extending from the central rotary drive mechanism.

Moreover, this structure permits easy deformation of an inserted disk cartridge, particularly the shutter mechanism.

Referring to prior art FIG. 6, which illustrates a cross-sectional view of the conventional tube holder 2 and drive chassis 1 with a disk cartridge 9 inserted therein, shutter 91 of the disk cartridge 9 appears shaped like the letter "U" rotated 90° counter clockwise. The top wall 201 and side walls (not shown) of the tube holder 2 restrain travel and deformation of the corresponding walls of the disk cartridge. However, as the underside wall 202 of the tube holder 2 is left largely opened as discussed above, the corresponding disk cartridge surface may deform slightly or warp downward, especially where the cartridge is made of a plastic material as commonly encountered in the art. More importantly, the shutter 91 does not engage the hollow underside wall 202, and it deforms downwardly as well in concert with, or independently of the disk cartridge housing. In other words, the disk cartridge is impeded from movement only with respect to its hard case area excluding the shutter.

Often, as the shutter 91 deforms, the lower projection of tip 91b thereof spans the gap 300b between the disk cartridge and the underside of the tube holder 2 and extends therethrough. This is especially true when the shutter 91 is exposed to manufacturing errors during deformation or the disk cartridge 9 has undergone frequent use. Consequently, this protruding shutter tip tends to contact the center axis or the central rotary drive 50, particularly the hub area 3 and the protrusions 31, 32 extending therefrom, during cartridge ejection operation, thus preventing the ejection. Such a problem can be solved by positioning the cartridge insertion/extraction position sufficiently above and far from the drive mechanism. However, doing so creates a problem of increasing the device thickness to undesirable levels.

Therefore, an object of the present invention is to block undesirable protrusion or extension of the shutter on the rotation drive mechanism side of the holder to prevent contact therebetween. It is a further object of the present invention to implement a shutter blocking or securing device that does not adversely impact in a serious manner the overall thickness of the disk drive device.

SUMMARY OF THE INVENTION

In accordance with these and related objects, the disk drive of the present invention preferably comprises: 1) a substantially tube-shaped holder for releasably receiving cartridge-based disk media in an insertable/extractable manner; 2) a drive chassis including a central rotary drive extending towards the underside of an inserted disk cartridge, the central rotary drive terminating in a protrusion to engage the central hub of the disk cartridge and rotate the disk housed therein; 3) a cartridge guiding mechanism in communication with the holder and chassis for guiding an inserted cartridge between an insertion/extraction position and a recording position relative to read/write recording heads and the central drive; and 4) a shutter guide in communication with the retractable shutter member of the inserted disk cartridge and the cartridge-guiding mechanism to engage the shutter member and push it away or deflect it from the central rotary drive when the cartridge guiding mechanism positions the disk cartridge at the insertion/extraction position.

According to the presently preferred embodiments, the cartridge-guiding mechanism includes a bottom guiding component which engages and guides the lower surface of the cartridge containing the hub opening. Further, this bottom guiding component may be divided into two separate, substantially parallel runners, each engaging a side of the cartridge. The shutter guide is positioned between these guiding runners proximate the central rotary drive to receive and guide the cartridge shutter up and over the central rotary drive along one or more bottom-guiding surfaces as the cartridge is being inserted or extracted. This allows engagement of the shutter only when it passes near the central rotary drive components during cartridge extraction, and thus the shutter guide does not interfere with normal read/write operations while the cartridge is in recording position.

Further, it is preferred that the shutter guide be made of flexible, biasing material and be fixed to the chassis at one end to impart yielding pressure to the cartridge shutter as it passes in the vicinity of the central rotary drive during insertion and extraction yet still permit positive engagement between the central rotary drive and the disk cartridge hub mechanism during disk media access operations.

Other objects and attainments together with a fuller understanding of the invention will become apparent and appreciated by referring to the following description of specific, preferred embodiments and claims taken in conjunction with the accompanying drawings.

BRIEF DESCRIPTION OF THE DRAWINGS

In the drawing(s) wherein like reference symbols refer to like parts:

FIG. 1 is a plan view of a disk drive according to the first preferred embodiment;

FIG. 2 is a partial cross-sectional view of the disk drive shown in Fig. 1 taken along line 1000;

FIG. 3 is a plan view of a disk drive according to the second preferred embodiment;

FIG. 4 is a partial cross-sectional view of the disk drive shown in FIG. 3 taken along line 1500;

FIG. 5 is a partial cross-sectional view of the disk drive shown in FIG. 3 taken along line 2000; and prior art FIG. 6 is a partial cross-sectional view of a conventional disk drive.

DESCRIPTION OF THE PREFERRED EMBODIMENTS

Reference is now made to FIG. 1, in which a plan view of a disk drive according to the first preferred embodiment is shown. FIG. 2 illustrates a partial cross-sectional view taken along line 1000. In FIG. 1, the components located in front of the major area have been omitted in order to show the major area. It should be noted that this disk drive embodiment is especially useful in slimline applications such as notebook computers and other information processing devices.

In Figs. 1 and 2, reference numeral 9 indicates the cartridge that houses a magnetic disk (not shown), and includes shutter 91 that opens and closes the head insertion opening provided in cartridge 9. The disk drive chassis 1 on which components comprising the device are installed is shown beneath holder 2 that houses cartridge 9 and that can move cartridge 9 between the insertion/extraction position and the recording/reading position. Reference numerals 21 and 22 represent substantially parallel guides or runners which are part of holder 2 and which guide the sides and bottom of cartridge 9. Substantially circumscribing the runners 21 and 22 is the top restraining wall 201 of the holder 2 indicated by dashed lines here to show other details of the disk drive of the first preferred embodiment.

Hub platform 3 is installed on the top of the central rotary drive 50 to receive accept the hub provided in the center of the disk cartridge (not shown). Located in the center of the hub platform 3 along the rotational axis of the central rotary drive 50 is positioning pin 31 which engages the center hole of the cartridge hub to position the disk with respect to the read/write heads 500 of read/write mechanism 501 and the central rotary drive 50. Drive pin 32 is also provided on the hub platform to engages with the eccentric hole of the cartridge hub to transfer drive force to the disk.

Here, the shutter guide preferably comprises guiding spring 5 fixed to chassis 1 by screw 51 at its base area 5a. This guiding spring 5 further includes rising area 5b which slopes up from base area 5a to holder 2, top area 5c which begins sliding frictional contact with cartridge 9 at the tip of rising area 5b, and guiding area 5d which slopes down from substantially flat area 5c to chassis 1. Holder 2 is approximately flat square cylinder with both the cartridge 9 insertion opening side and the opposing side left open, and its bottom side, i.e., the side facing the rotation drive device, is mostly open except that bottom guides 21 and 22 are provided in the areas corresponding to the two sides of the cartridge 9.

When holder 2 is moved to the insertion/extraction position from the recording/reading position by an ejection operation, cartridge 9 housed inside the holder is also raised in the direction away from the rotation drive device. During this operation, cartridge 9 is supported by bottom guides 21 and 22, and is restricted in the direction of hub platform 3. However, because shutter 91 is located in the center of the cartridge and does not contact bottom guides 21 and 22, shutter 91 ends up sagging in the direction of hub platform 3 as shown in FIG. 2, especially if the tips 9a and 9b have been outwardly bent through manufacturing defects or use. Cartridge 9 is thrust in the direction of arrow a and ejected when moved from the recording/reading position to the insertion/extraction. During this operation, in conventional magnetic recording/reading devices as discussed in reference to prior art FIG. 6, the ejection of cartridge 9 is prevented because the tip area 91b of shutter 91, which protrudes toward hub platform 3, is stepped by positioning pin 31 or drive pin 32.

However, in the first preferred embodiment, shutter 91 is raised along rising area 5b of guiding spring 5, smoothly sliding along top area 5c above positioning pin 31 and drive pin 32, and thus does not interfere with the ejection of cartridge 9. Therefore, it is not necessary to make the distance between holder 2 located in the insertion/extraction position and the hub platform large enough to accommodate the opening of shutter 91, as would otherwise be necessary Note that guiding area 5d of guiding spring 5 is provided in order to prevent the tip of cartridge 9 from sliding under guiding spring 5 when cartridge 9 is being inserted into holder 2.

FIG. 3 illustrates a plan view of major areas of the disk drive according to the second preferred embodiment. FIGS. 4 and 5 depict partial cross-sectional views taken along lines 1500 and 2000, respectively. Here, protrusion 22a is shown protruding from the area of bottom guide 22 adjacent the central rotary drive 50. Guiding surface 22c is provided on the cartridge 9 insertion opening side of protrusion 22a, and guiding surface 22b is provided on the opposite side.

When cartridge 9 is inserted into holder 2, position of cartridge 9 relative to hub platform 3 is restricted by bottom guides 21 and 22. Shutter 91 is positionally restricted by protrusion 22a near hub platform 3, and thus does not protrude from bottom guides 21 or 22 toward hub platform 3. Guided by upward-sloping guiding surface 22c during insertion and by upward-sloping guiding surface 22b during extraction, shutter 91 rides on protrusion 22a in areas immediately adjacent the central rotary drive 50, smoothly passing over positioning pin 31 and drive pin 32, and thus does not interfere with the ejection or insertion of cartridge 9. Furthermore, because protrusion 22a protrudes from the area of bottom guide 22 adjacent the central rotary drive, the area that connects and supports both the spindle unit installation area and the carriage installation area is not weakened even when the part of chassis 1 that corresponds to protrusion 22a is made concave. So this embodiment is especially preferred in situations where chassis strength is the premium design concern.

As explained above, the disk drive of the present invention preferably includes a bottom guiding area for the cartridge holder divided into two sections along the side of the cartridge, along with a shutter guide provided within the range of the bottom opening of the cartridge holder formed between the two divided bottom guiding areas and near the rotation drive means. The shutter guide guides the cartridge shutter upward from the central rotary drive when the cartridge-guiding means is either being inserted into or extracted from the holder. Therefore, the cartridge can always be extracted even when the cartridge shutter comes close to the rotary drive due to its own weight and without being directly guided by the cartridge holder.

Furthermore, because at least one of the bottom guiding surfaces of the shutter guide is preferably formed protruding toward the central rotary drive and disposed adjacent thereto, it is possible to guide the cartridge shutter only when it passes near the rotary drive during cartridge extraction, and thus no undue force is applied to the cartridge when it is positioned for read/write access. Additionally, when providing a concave area in the chassis for the cartridge holder to escape, the shape of the shutter guide can reduce deleterious effects of concavity on the overall chassis strength.

By integrating a shutter guide directly with the holder as in the case with the second preferred embodiment, the above effects can be realized without increasing the number of components, and with hardly any component cost increases being incurred, if viewed from the holder manufacturing cost standpoint.

On the other hand, because the shutter guiding could made of a flexible material and at least one of its tips is fixed on the chassis which supports the rotary drive, as in the case with the first preferred embodiment, the shutter guide can flex when the cartridge is at recording position to enable proper mounting of the disk cartridge onto the central rotary drive. Because of its flexibility, the shutter guide can provide sufficient thrust for securely maintaining the cartridge shutter far enough away not to contact the protrusions of the rotary drive when the cartridge is at insertion/extraction position. Furthermore, because the shutter guide is flexed so as to always press the cartridge against the top of the cartridge guides and/or holder, cartridge vibration is suppressed. Additionally, the friction due to this flexion can effectively prevent the cartridge from flying out excessively during ejection.

As explained above, according to the invention, by providing a component for restricting the position of the cartridge shutter in the direction of the hub platform near the hub platform, the distance between the recording/reading position and the insertion/extraction position that the holder travels can be shortened, and thus device thickness can be reduced.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A disk drive for housing, in an insertable/extractable manner, a disk cartridge enclosing a recording medium and including a first surface defining a hub to position the medium and a movable shutter in slidable attachment therewith, the disk drive comprising:

a holder for releasably receiving the disk cartridge and positioning the received disk cartridge between separate insertion/extraction and recording positions, said holder comprising spaced apart, opposing first and second runners engaging side surfaces of the received disk cartridge;

a disk chassis in communication with said holder including a central rotary drive extending therefrom between said first and second holder runners for engaging the received disk cartridge hub when the received disk cartridge is at the recording position, said central rotary drive rotatable about a central axis; and a stationary shutter guide in communication with said holder positioned between said first and second holder runners and proximate said central rotary drive of said chassis and comprising:

an angled member for releasably receiving the received disk cartridge shutter in slidable frictional engagement; and a support member in communication with said angled member, said support member intersecting a plane crossing the central axis of said central rotary drive and normal to said first and second holder runners for releasably engaging a defective extending portion of the received disk cartridge shutter and preventing the defective extending portion from catching against said central rotary drive when the received disk is ejected from said holder.

2. The disk drive according to claim 1, wherein said shutter guide comprises a flexible spring, said spring including a fixed member affixed to said chassis and supporting said angled member towards said central rotary drive; and wherein said support member comprises a substantially planar member extending from said angled member for slidably engaging the received disk cartridge and pushing the received disk cartridge shutter away from said central rotary drive when said received disk cartridge is extracted from said holder.

3. The disk drive according to claim 2, wherein said shutter guide spring further comprises a second angled member extending from said substantially planar member for slidably engaging the received disk cartridge and pushing the received disk cartridge shutter away from said central rotary drive when said received disk cartridge is inserted into said holder.

4. An information processing device, comprising:

a disk drive for housing, in an insertable/extractable manner, a disk cartridge enclosing a recording medium and including a first surface defining a hub to position the medium and a movable shutter in slidable attachment therewith, the disk drive comprising:

a holder for releasably receiving the disk cartridge and positioning the received disk cartridge between separate insertion/extraction and recording positions, said holder comprising spaced apart, opposing first and second runners engaging side surfaces of the received disk cartridge;

a disk chassis in communication with said holder including a central rotary drive extending therefrom between said first and second holder runners for engaging the received disk cartridge hub when the received disk cartridge is at the recording position, said central rotary drive rotatable about a central axis; and a stationary shutter guide in communication with said holder positioned between said first and second holder runners and proximate said central rotary drive of said chassis, comprising:

an angled member for releasably receiving the received disk cartridge shutter in slidable frictional engagement; and a support member in communication with said angled member, said support member intersecting a plane crossing the central axis of said central rotary drive normal to said first and second holder runners for releasably engaging a defective extending portion of the received disk cartridge shutter and preventing the defective extending portion from catching against said central rotary drive when the received disk is ejected from said holder.

5. The information processing device according to claim 4, wherein said disk drive shutter guide comprises a flexible spring, said spring including a fixed member affixed to said chassis and supporting said angled member towards said central rotary drive; and wherein said support member comprises a substantially planar member extending from said angled member for slidably engaging the received disk cartridge and pushing the received disk cartridge shutter away from said central rotary drive when said received disk cartridge is extracted from said holder.

6. The information processing device according to claim 5, wherein said shutter guide spring further comprises a second angled member extending from said substantially planar member for slidably engaging the received disk cartridge and pushing the received disk cartridge shutter away from said central rotary drive when said received disk cartridge is inserted into said holder.

7. The disk drive according to claim 1, wherein said shutter guide comprises a stationary protrusion extending from said first holder runner, said stationary protrusion including a fixed member affixed to said first holder runner and terminating in said angled member at a distal end proximate said central rotary drive.

8. The disk drive according to claim 7, wherein said stationary protrusion includes first and second opposing angled members on said distal end to engage and displace the received cartridge shutter from said central rotary drive during cartridge insertion and ejection operations.

9. The information processing device according to claim 4, wherein said shutter guide comprises a stationary protrusion extending from said first holder runner, said stationary protrusion including a fixed member affixed to said holder runner and terminating in sáid angel member at a distal end proximate said central rotary drive.

10. The information processing device according to claim 9, wherein said stationary protrusion includes first and second opposing angled members on said distal end to engage and displace the received cartridge shutter from said central rotary drive during cartridge insertion and ejection operations.

* * * * *

UNITED STATES PATENT AND TRADEMARK OFFICE
CERTIFICATE OF CORRECTION

PATENT NO. : 5,663,852
DATED : September 02, 1997
INVENTOR(S) : Kazuyoshi Fujimori, et al.

It is certified that an error appears in the above identified patent and that said Letters Patent is hereby corrected as shown below:

Column 8, line 25, insert --first-- between "said" and "holder".

Signed and Sealed this

Ninth Day of December, 1997

Attest:

BRUCE LEHMAN

Attesting Officer

*Commissioner of Patents and Trademarks*